(12) United States Patent
Antin et al.

(10) Patent No.: US 11,921,071 B2
(45) Date of Patent: Mar. 5, 2024

(54) METHOD FOR CHECKING THE INTEGRITY OF COMPOSITE LOAD BEARING MEMBER

(71) Applicant: Kone Corporation, Helsinki (FI)

(72) Inventors: Kim Antin, Helsinki (FI); Sven Bossuyt, Helsinki (FI); Antti Hassinen, Helsinki (FI); Juha Helenius, Helsinki (FI); Juha Honkanen, Helsinki (FI); Mika Juntunen, Helsinki (FI); Petri Kere, Helsinki (FI); Mikko Lassila, Helsinki (FI); Hannu Lehtinen, Helsinki (FI); Aleksi Nareikko, Helsinki (FI); Mikko Puranen, Helsinki (FI); Kai Ruotsalainen, Helsinki (FI); Petteri Valjus, Helsinki (FI)

(73) Assignee: Kone Corporation, Helsinki (FI)

( * ) Notice: Subject to any disclaimer, the term of this patent is extended or adjusted under 35 U.S.C. 154(b) by 1378 days.

(21) Appl. No.: 16/367,426

(22) Filed: Mar. 28, 2019

(65) Prior Publication Data

US 2019/0219530 A1  Jul. 18, 2019

Related U.S. Application Data

(63) Continuation of application No. PCT/EP2017/077888, filed on Oct. 31, 2017.

(30) Foreign Application Priority Data

Oct. 31, 2016  (EP) .................................... 16196570

(51) Int. Cl.
*G01N 25/72* (2006.01)
*B66B 7/12* (2006.01)
*B29L 31/00* (2006.01)

(52) U.S. Cl.
CPC ........... *G01N 25/72* (2013.01); *B66B 7/1215* (2013.01); *B29L 2031/707* (2013.01)

(58) Field of Classification Search
CPC .. G01N 25/72; B66B 7/1215; B29L 2031/707
(Continued)

(56) References Cited

U.S. PATENT DOCUMENTS 4,924,096 A * 5/1990 Mroczkowski .... G01R 31/2656
                                                        324/501
5,039,572 A * 8/1991 Bobsein ................ C08L 101/00
                                                        264/258
(Continued)

FOREIGN PATENT DOCUMENTS

CN         1613740 A      5/2005
CN      101276150 A  *  10/2008
(Continued)

OTHER PUBLICATIONS

16367426_2023-10-25_CN_219730382_U_H.pdf,Sep. 2023.*
(Continued)

*Primary Examiner* — Gail Kaplan Verbitsky
(74) *Attorney, Agent, or Firm* — HARNESS, DICKEY & PIERCE, P.L.C.

(57) ABSTRACT

The invention relates to a method for inspecting quality and/or condition of an elongated composite member, which is a load bearing member of a rope of a hoisting apparatus, such as an elevator, or a precursor of such a load bearing member, the method comprising providing an elongated composite member; and changing the temperature of said elongated composite member by heating or cooling said elongated composite member via a flank thereof; and scanning said elongated composite member from a lateral side thereof with a thermal imaging device after said changing of
(Continued)

the temperature; and creating thermographic images of said elongated composite member.

26 Claims, 5 Drawing Sheets

(58) Field of Classification Search
USPC .................. 374/4, 5, 57, 120, 121, 124, 137
See application file for complete search history.

(56) References Cited

U.S. PATENT DOCUMENTS

| | | | | |
|---|---|---|---|---|
| 5,640,667 | A * | 6/1997 | Freitag | B22F 10/28 |
| | | | | 419/38 |
| 6,000,844 | A * | 12/1999 | Cramer | G01N 25/72 |
| | | | | 374/7 |
| 6,013,915 | A * | 1/2000 | Watkins | G01N 25/72 |
| | | | | 250/341.7 |
| 8,878,926 | B2 * | 11/2014 | Ye | G01N 25/72 |
| | | | | 348/92 |
| 9,519,844 | B1 * | 12/2016 | Thompson | G01N 25/72 |
| 11,529,774 | B2 * | 12/2022 | Tyson, II | G01N 21/88 |
| 2005/0063449 | A1 | 3/2005 | Lustenberger | |
| 2009/0201971 | A1 * | 8/2009 | Goldammer | G01N 25/72 |
| | | | | 374/45 |
| 2011/0088981 | A1 | 4/2011 | Urbani et al. | |
| 2014/0267694 | A1 * | 9/2014 | Henderkott | H04N 5/33 |
| | | | | 348/132 |
| 2016/0177772 | A1 * | 6/2016 | Smith | G01J 5/0037 |
| | | | | 415/118 |

FOREIGN PATENT DOCUMENTS

| | | | | |
|---|---|---|---|---|
| CN | 101576600 | A | 11/2009 | |
| CN | 1886649 | B * | 4/2010 | ............. G01K 1/02 |
| CN | 104359944 | A * | 2/2015 | |
| CN | 105074084 | A | 11/2015 | |
| CN | 205603125 | U1 * | 9/2016 | |
| CN | 219730382 | U * | 9/2023 | |
| EP | 1980847 | A2 * | 10/2008 | ............. G01N 25/72 |
| EP | 2141489 | A1 | 1/2010 | |
| EP | 3015413 | A1 | 5/2016 | |
| JP | 62097835 | A * | 5/1987 | |
| JP | H03115817 | A * | 5/1991 | |
| JP | H03154857 | A * | 7/1991 | |
| KR | 2008060853 | A * | 7/2008 | ....... H01L 21/67109 |
| KR | 20130087487 | A * | 8/2013 | |
| WO | WO-2007138425 | A1 * | 12/2007 | ............. C08J 7/123 |

OTHER PUBLICATIONS

International Search Report (PCT/ISA/210) for PCT International Application No. PCT/EP2017/077888 which has an International Filing Date of Oct. 31, 2017.
Written Opinion of the International Searching Authority (PCT/ISA/237) for PCT International Application No. PCT/EP2017/077888 which has an International Filing Date of Oct. 31, 2017.
European Search Report (EPO Form 1503 03.82) completed on Apr. 11, 2017 for European Application No. EP16196570.
Chinese Office Action dated Apr. 3, 2020 issued in corresponding Chinese Application No. 201780066266.8.
European Office Action dated Mar. 25, 2021 issued in corresponding European Appln. No. 16196570.2.

* cited by examiner

METHOD FOR CHECKING THE INTEGRITY OF COMPOSITE LOAD BEARING MEMBER

This application is a continuation of PCT International Application No. PCT/EP2017/077888 which has an International filing date of Oct. 31, 2017, which claims priority to European Application No. 16196570.2, filed on Oct. 31, 2016, the entire contents of each of which are incorporated herein by reference.

FIELD OF THE INVENTION

The invention relates to inspecting condition of an elongated composite member of a rope of a hoisting apparatus. The hoisting apparatus is preferably an elevator for vertically transporting passengers and/or goods.

BACKGROUND OF THE INVENTION

In hoisting devices such as elevators, one or more ropes are used as the means by which the load to be hoisted is suspended. Each elevator rope typically includes one or more load bearing members that are elongated in the longitudinal direction of the rope, each forming a structure that continues unbroken throughout the length of the rope. Load bearing members are the members of the rope which are able to bear together the load exerted on the rope in its longitudinal direction. The load, such as a weight suspended by the rope, causes tension on the load bearing member, which tension can be transmitted by the load bearing member in question all the way from one end of the rope to the other end of the rope. Ropes may further comprise non-bearing components, such as a coating, which cannot transmit tension in the above described way. The coating can be utilized for protection of the load bearing members and/or facilitating contact with rope wheels and/or for positioning adjacent load bearing members relative to each other, for example.

Such ropes exist, where the load bearing members are made of composite material wherein reinforcing fibers are embedded in a polymer matrix. Such load bearing members are structurally very different, when compared to conventional steel rope technology. Therefore, they are also prone to different kind of defects, caused already in manufacturing or degradation in use. These typically appear as transverse cracking of the matrix and/or the fibres or internal delamination of the load bearing member in longitudinal direction of the load bearing member. Beside delamination and cracks, other examples of significant flaws in composites are: voids, porosity, inclusions, wear, impact damage, incorrect cure and fibre breakage, wrinkling or waviness. Many of the flaws and failures occur first without being detrimental for the integrity of the structure. Accumulation of structural failures under load results leads in a progressively increasing number of detectable failures before final catastrophic failure.

In prior art, the quality and/or condition of the composite load bearing members has been inspected by monitoring electrical properties of the load bearing members, such as the resistance of a circuit formed partially by the load bearing members or the resistance of a circuit formed partially by conductor wires embedded inside the load bearing members.

It has been now found out that prior art inspection methods, such as those monitoring electric properties, do not reliably reveal all kinds of defects in fiber-composite members.

BRIEF DESCRIPTION OF THE INVENTION

The object of the invention is to introduce an improved method whereby quality and/or condition of an elongated composite member can be inspected, which elongated composite member is a load bearing member of a rope of a hoisting apparatus, such as an elevator, or a precursor of such a load bearing member. An object is to introduce a solution by which one or more of the above defined problems of prior art and/or problems discussed or implied elsewhere in the description can be solved. An object is particularly to introduce a solution by which initial flaws or failures inside a composite member can be detected, localized and reacted to before they become catastrophic. An object is to introduce such solutions which are simply usable as part of the manufacturing process before completion of the product, as well as solutions usable for inspection of a completed product. Embodiments are presented, inter alia, which enable detection of the size, shape, orientation and type of the initial flaws or failures inside the elongated composite member. Embodiments are presented, inter alia, by which particularly delamination of internal structures of the elongated composite member can be effectively be detected, localized and reacted to.

It is brought forward a new method for inspecting quality and/or condition of an elongated composite member, which preferably is a load bearing member of a rope of a hoisting apparatus, such as an elevator, or a precursor of such a load bearing member, the method comprising providing an elongated composite member; and changing the temperature of said elongated composite member by heating or cooling said elongated composite member via a flank thereof; and scanning said elongated composite member from a lateral side thereof with a thermal imaging device after said changing of the temperature; and creating thermographic images of said elongated composite member. With this solution one or more of the above mentioned objects can be achieved. Preferable further details are introduced in the following, which further details can be combined with the method individually or in any combination.

In a preferred embodiment, said elongated composite member comprises non-metallic reinforcing fibers embedded in a polymer matrix, said reinforcing fibers preferably being carbon fibers or glass fibers. Quality and/or condition inspection by the method as defined is particularly advantageous with composite members as defined, because they are fragile and sensitive to formation of internal flaws or failures that are otherwise difficult to notice and localize.

In a preferred embodiment, the method further comprises, after said creating, detecting temperature deviations, such as temperature peaks and/or temperature dips, in the thermographic images of said elongated composite member. Then, preferably said detecting temperature peaks comprises detecting in the thermographic images areas where temperature exceeds a predetermined limit. Then, preferably said detecting temperature dips comprises detecting in the thermographic images areas where temperature is below a predetermined limit. In addition, or as an alternative to detecting said dips and/or peaks, preferably said detecting temperature peaks and/or temperature dips in the thermographic images comprises comparing zones of a thermographic image or thermographic images with each other. In said comparing, zones that are in longitudinal direction of said elongated composite member from consecutive sections of the composite member are compared, and said detecting comprises detecting substantial temperature differences between such zones, such as temperature differences of predetermined magnitude, i.e. temperature differences that exceed a predetermined threshold.

In a preferred embodiment, said detecting temperature deviations is performed by a computer.

In a preferred embodiment, the method further comprises performing one or more predefined actions when a temperature deviation, such as a temperature peak or temperature dip, is detected in the thermographic images. Said one or more predefined actions include one or more of producing an alarm signal, storing data indicating location of the elongated composite member wherein a temperature deviation such as a temperature peak or temperature dip was detected, storing thermographic image(s) of the location of the elongated composite member wherein temperature deviation such as a temperature peak or temperature dip was detected, making a marking on the location of the elongated composite member wherein temperature deviation such as a temperature peak or temperature dip was detected.

In a preferred embodiment, the composite member is substantially larger in its width direction than in its thickness direction. This facilitates use of a flank of the composite member for the temperature changing and/or the scanning. This advantage is considerable particularly when the width/thickness ratio said composite member is substantially greater than one, such as more than 2.

In a preferred embodiment, the changing of the temperature is performed via a flank of the composite member, which flank faces in thickness direction of the composite member.

In a preferred embodiment, the scanning is performed in thickness direction of the composite member, scanning a flank thereof, which flank faces in thickness direction of the composite member. Thus, the scanned area will be large in size and temperature deviations stand out clearly. To facilitate the temperature changing and/or scanning, the width/thickness ratio said composite member is preferably more than 2.

In a preferred embodiment, said elongated composite member is scanned while it is in a heated state produced by said heating or in a cooled state produced by said cooling, respectively.

In a preferred embodiment, said changing the temperature of said elongated composite member is directed on only a length of said elongated composite member at a time, which length is substantially shorter than the overall length of the elongated composite member, preferably less than 10% of the overall length of the elongated composite member.

In a preferred embodiment, the method is performed during the manufacturing of the rope. Preferably, the method is performed as an on-line inspection method in the manufacturing line of the composite member or the rope. Preferably, the method is performed in a factory manufacturing ropes or composite members therefor.

In a preferred embodiment, said elongated composite member is guided to run via a stationary inspection station comprising said thermal imaging device. Preferably, said elongated composite member is arranged to pass past said thermal imaging device, which continuously or intermittently performs scanning of said elongated composite member.

In a preferred embodiment, in said changing, the temperature of said elongated composite member is changed by cooling said elongated composite member.

In a preferred embodiment utilizing cooling, in said providing, an elongated composite member is provided which has a core temperature at least 50 Celsius degrees or more. Particularly, the core temperature is at least 50 Celsius degrees or more when starting said changing.

In a preferred embodiment utilizing cooling, in said cooling heat accumulated in said elongated composite member during manufacturing process of said elongated composite member or a rope comprising said elongated composite member is removed from said elongated composite member. In this case, one preferred option is that said providing comprises forming said elongated composite member, preferably by pultrusion, and at least part of said heat accumulated in said elongated composite member has been accumulated in said elongated composite member in said forming (by pultrusion). Another preferred option is that the manufacturing process of the rope comprises surface treatment of said elongated composite member, such as plasma treatment, wherein temperature of said elongated composite member rises, and at least part of said heat accumulated has been accumulated in said elongated composite member in said surface treatment. A third preferred option is that the manufacturing process (of the rope) comprises applying of heated coating, eg. having temperature over 100 deg Celsius, on said elongated composite member, such as by extrusion coating, and at least part of said heat accumulated has been accumulated in said elongated composite member in said applying, preferably said extrusion coating.

In a preferred embodiment utilizing cooling, said cooling is performed by aid of a cooling device. Using a device for producing the temperature change is advantageous so that the temperature change produced in the composite member can be space-efficiently achieved, simply controlled, and the response is adequately swift and substantial to enable easy detection of temperature deviations in the thermographic images of said elongated composite member.

In a preferred embodiment utilizing cooling, in said cooling said elongated composite member or a rope comprising said elongated composite member is cooled with fluid of substantially lower temperature than the temperature of said elongated composite member. Preferably, said fluid is sprayed or blown against the said elongated composite member or a rope comprising said elongated composite member by a spraying or blowing machine, in particular against the surface of said elongated composite member or a rope comprising said elongated composite member. Said fluid is preferably gaseous fluid, such as ambient air, but alternatively it can be liquid.

In a preferred embodiment utilizing heating, in said changing the temperature of said elongated composite member is changed by heating said elongated composite member.

In one kind of preferred embodiment utilizing heating, said heating comprises a step of manufacturing process of the rope, wherein temperature of said elongated composite member rises. In this case, one preferred option is that said step of manufacturing process of the rope is a surface treatment of said elongated composite member, such as plasma treatment. Another preferred option is that said step of manufacturing process of the rope is forming of said elongated composite member by pultrusion. A third preferred option is that said step of manufacturing process of the rope is applying of hot coating on said elongated composite member, such as by extrusion coating. The temperature of the hot coating to be applied on said elongated composite member is preferably over 100 deg Celsius. This can be implemented most simply by applying the coating by extrusion coating since in an extrusion coating process the coating material is normally applied in a high temperature.

In another kind of preferred embodiment utilizing heating, said heating is performed by aid of a heating device. Using a device for producing the temperature change is advantageous so that the temperature change produced in the composite member can be space-efficiently achieved, simply controlled, and the response is adequately swift and substantial to enable easy detection of temperature deviations in the thermographic images of said elongated composite member. Said heating device can be an induction heater, for example. In this case, said heating comprises electromagnetic induction heating. Alternatively, said heating device could be a flash light heater. Generally, said heating can comprise heating by pulses. Then, said heating can comprise heating by pulsed phase thermography (PPT). Alternatively, said heating could comprise flash light pulsing. Heating by pulses facilitates detection of flaws or failures as these will cause a local phase shift in the heat waves. Then, the detection temperature deviations can comprises detection of local phase shift in the heat waves. This step of the detection can be most simply implemented by a computer.

In a preferred embodiment utilizing heating or cooling, said heating or cooling comprises directing heating or cooling from one side of said elongated composite member, and in said scanning said elongated composite member is scanned with a thermal imaging device from the opposite side.

In a preferred embodiment, said changing the temperature of said elongated composite member, i.e. said heating or cooling, and said scanning are directed on opposite flanks of said elongated composite member.

In a preferred embodiment, the reinforcing fibers are distributed substantially evenly in the polymer matrix. They are bound to each other by the polymer matrix. Furthermore, preferably, over 50% of the cross-sectional square area of the composite member consists of said reinforcing fibers. Thereby, load bearing ability with high tensile stiffness can be facilitated. The reinforcing fibers f are preferably long continuous fibers in the longitudinal direction of the elongated composite member, preferably continuing unbroken throughout the whole length of the elongated composite member. Preferably, substantially all the reinforcing fibers f of each composite member are parallel with the longitudinal direction of the composite member. The composite member formed is a solid elongated rod-like one-piece structure.

In a preferred embodiment, the composite member is inspected either naked of additional rope components, such as other composite members or substantial amount of coating, or while it has additional rope components attached thereto, said additional rope components including one or more composite members and/or a coating. In the latter case, the composite member is comprised in a rope and embedded in a coating forming the outer surface of the rope and said scanning is performed through the coating. The coating is preferably made of polymer material. Presence of the coating on the composite member may be in some cases advantageous as in this way defects in the coating can also detected. Then, the method is used also to inspect quality and/or condition of the coating. This may be advantageous particularly when the coating has a complicated contoured structure, such as grooved structure.

In a preferred embodiment, water phase transition is utilized for increasing the thermal contrast. When utilizing heating for said temperature changing, the core temperature of the elongated composite member 1, when starting said heat changing by heating, is zero Celsius degrees or below, and in said heating the core temperature of the elongated composite member 1 is brought substantially, such as plurality of degrees, above zero Celsius degrees so that water inside the composite member 1 would undergo a phase transition in the heating. Correspondingly, when utilizing cooling for said temperature changing the core temperature of the elongated composite member 1, when starting said heat changing by cooling, is substantially, such as plurality of degrees, above zero Celsius degrees, and in said cooling the core temperature of the elongated composite member is brought to zero Celsius degrees or below, so that water inside the composite member would undergo a phase transition in the cooling.

It is also brought forward a new method for manufacturing a hoisting rope of a hoisting apparatus, such as an elevator, which rope comprises one or more composite members as load bearing members of the rope, said elongated composite member preferably comprising non-metallic reinforcing fibers embedded in polymer matrix, said reinforcing fibers preferably being carbon fibers or glass fibers, the method comprising inspecting quality and/or condition of one or more of the elongated composite members with a method as defined anywhere above or elsewhere in the application such as in the claims. With this solution one or more of the above mentioned objects can be achieved. Preferable further details have been introduced above and in the following, which further details can be combined with the method individually or in any combination.

In a preferred embodiment, the method comprises forming said elongated composite member.

In a preferred embodiment, said forming comprises pultrusion, in particular pultrusion of the reinforcing fibers and fluid material of the polymer matrix through a die.

In a preferred embodiment, the method further comprises applying coating on the composite member. The coating can be applied on more than one of said composite members whereby a rope containing more than one composite members as load bearing members embedded in common coating can be manufactured.

Preferably, said rope is such that each composite member continues unbroken throughout the length of the rope.

Preferably, said rope is such that each composite member is parallel with the longitudinal direction of the rope.

In a preferred embodiment, the rope is a suspension rope of an elevator for suspending an elevator car.

It is also brought forward a new arrangement for inspecting quality and/or condition of an elongated composite member, which is a load bearing member of a rope of a hoisting apparatus, such as an elevator, or a precursor of such a load bearing member. The arrangement is arranged to change the temperature of an elongated composite member by heating or cooling said elongated composite member via a flank thereof; and scan said elongated composite member from a lateral side thereof with a thermal imaging device after said changing of the temperature; and create thermographic images of said elongated composite member. Preferably, said elongated composite member comprises non-metallic reinforcing fibers embedded in a polymer matrix, said reinforcing fibers preferably being carbon fibers or glass fibers. With this solution one or more of the above mentioned objects can be achieved. The arrangement is preferably arranged to perform further method steps as described in the above. The arrangement can be arranged to perform individual further method steps as described in the above or plurality of method steps as described in the above in any combination, particularly to achieve advantages related to the method step(s) in question. The arrangement is preferably either an arrangement of inspecting quality and/or condition of an elongated composite member during manufacturing of a rope or an arrangement of inspecting quality and/or condition of an elongated composite member already forming part of an elevator.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
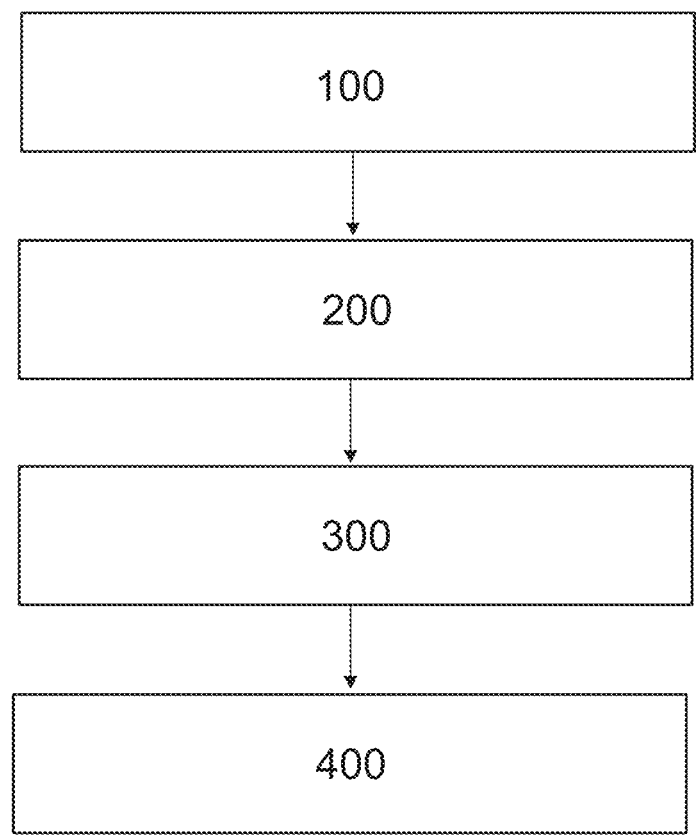
FIG. 1 illustrates steps of an embodiment of a method for inspecting quality and/or condition of an elongated composite member.

FIG. 1 illustrates steps of a preferred embodiment of a method for inspecting quality and/or condition of an elongated composite member 1, which is a load bearing member of a rope 2,2' of a hoisting apparatus, such as an elevator, or a precursor of such a load bearing member. The method comprises providing 100 an elongated composite member 1, said elongated composite member 1 being made of composite material comprising non-metallic reinforcing fibers f embedded in polymer matrix m, said reinforcing fibers preferably being carbon fibers or glass fibers. The elongated composite member 1 is a load bearing member of a rope 2,2' of a hoisting apparatus, such as an elevator, or a precursor of such a load bearing member. After this, the method comprises changing 200 the temperature of said elongated composite member 1 substantially by heating or cooling from a lateral side thereof said elongated composite member 1 via a flank 1a,1b thereof, which flank 1a,1b faces in transverse direction of the elongated composite member 1 relative to the longitudinal direction of the elongated composite member 1. Preferably, the composite member 1 is substantially larger in its width direction w than in its thickness direction t, and said transverse direction is thickness direction t of the composite member 1. After changing 200 the temperature of said elongated composite member 1, the method comprises scanning 300 said elongated composite member 1 from a lateral side thereof with a thermal imaging device 3. In the scanning 300, said elongated composite member 1 is scanned while it is in a heated state produced by said heating or in a cooled state produced by said cooling, respectively. The method furthermore comprises a step of creating 400 thermographic images 4, so called thermograms, of said elongated composite member 1 based on output of said scanning. A thermographic image reveals uneven changing of temperature, if there are temperature peaks or dips within the scanned length of the composite member 1. In general, it is possible to perform said changing 200 the temperature of said elongated composite member 1 by heating or cooling using any known way, such as utilizing convection, conduction, radiation or induction, for example.

Preferably, the method further comprises, after said creating 400 thermographic images 4, detecting temperature peaks or temperature dips in the thermographic images 4 of said elongated composite member 1. This detecting is preferably performed by a computer, whereby automatic execution of the method is facilitated. Thus, the method can be implemented as an automated on-line inspection method forming a part of a production line of a rope 2,2', for instance.

Figure 2:
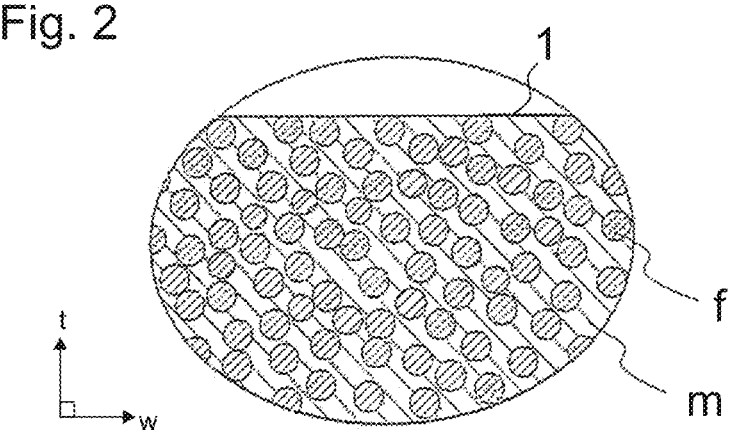
FIG. 2 illustrates a preferred inner structure of the elongated composite member.
Figure 3:
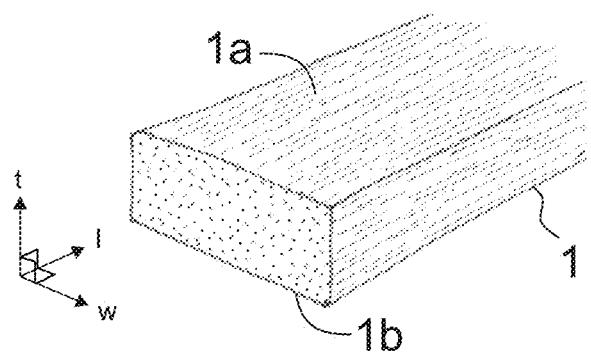
FIG. 3 illustrates preferred embodiment of the elongated composite member three-dimensionally.

Said reinforcing fibers f are most preferably carbon fibers, but alternatively they can be glass fibers, or possibly some other fibers. FIG. 2 illustrates a preferred inner structure of such a composite member 1, showing inside the circle an enlarged view of the cross section of the composite member 1 close to the surface thereof, as viewed in the longitudinal direction l of the composite member 1. The parts of the composite 1 not showed in FIG. 7 have a similar structure. FIG. 3 illustrates the composite member 1 three-dimensionally. The composite member 1 is made of composite material comprising reinforcing fibers f embedded in polymer matrix m. The reinforcing fibers f in the polymer matrix m are bound to each other with a polymer matrix m. This has been done e.g. in an earlier manufacturing phase by immersing them together in the fluid material of the polymer matrix which is thereafter solidified. Said immersing can be done in the form of pultrusion through a die. The reinforcing fibers f are distributed substantially evenly in polymer matrix m and bound to each other by the polymer matrix m. The composite member 1 formed is a solid elongated rod-like one-piece structure. Preferably, substantially all the reinforcing fibers f of each composite member 1 are parallel with the longitudinal direction of the composite member 1. Thereby, the fibers f are also parallel with the longitudinal direction of the rope 2,2' as each composite member 1 are to be oriented parallel with the longitudinal direction of the rope 2,2'. This is advantageous for the rigidity as well as behavior in bending. Owing to the parallel structure, the fibers in the rope 2,2' will be aligned with the force when the rope 2,2' is pulled, which ensures that the structure provides high tensile stiffness.

Figure 4A:
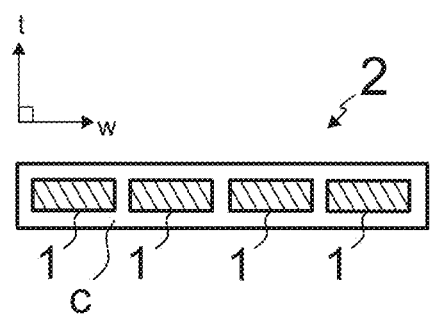
FIG. 4a illustrates preferred embodiment of a belt-shaped rope of a first kind comprising elongated composite members.
Figure 4B:
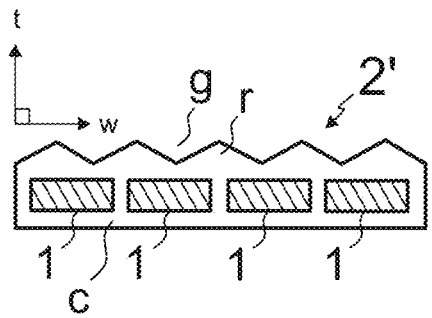
FIG. 4b illustrates preferred embodiment of a belt-shaped rope of a second kind comprising elongated composite members.

The composite member 1 can be inspected during the manufacturing of a rope, while the composite member 1 is naked of additional rope components, such as other composite members or substantial amount of coating around it. Then, to the composite member 1 can later, i.e. after said inspection, be attached additional rope components, such as other composite members or substantial amount of coating. Alternatively, the composite member 1 can be inspected while it already forms a part of a larger entity, i.e. a rope 2,2', and thereby has additional rope components attached thereto. Also when scanned together with other components described, a thermogram reveals without considerable distribution the internal flaws or failures of the composite member 1. FIGS. 4a and 4b illustrates each a completed rope 2,2' as viewed in longitudinal direction l of the composite member 1 and the rope 2,2'. Each rope 2,2' is belt-shaped. It is substantially larger in its width direction w than in its thickness direction t. As presented in FIG. 3, elongated composite members 1 of the like illustrated in FIGS. 1 and 2, are embedded in a coating c forming the outer surface of the rope 2,2'. Each composite member 1 is parallel with the longitudinal direction of the rope 2,2'. Each composite member 1 continues unbroken throughout the length of the rope 2,2' forming a load bearing member of the rope 2,2'. In the presented case the rope comprises plurality of composite members 1 adjacent each other in width direction of the rope 2,2', but alternatively it could comprise only one. The coating c is preferably made of polymer material. The coating c can be intended for protection of the composite members and/or facilitating contact with rope wheels and/or for positioning adjacent composite members 1 relative to each other, for example. The coating c is preferably furthermore preferably elastic, for which purpose the polymer material is preferably elastomer, such as polyurethane or silicon or rubber. The rope 2 of FIG. 4a is more specifically such that it has a smooth outer surface without grooves or teeth. The rope 2' of FIG. 4b is more specifically such that it has a contoured outer surface. The particular rope 2' illustrated in FIG. 4b is grooved. In particular, it comprises a grooved side face facing in thickness direction t of the rope 2', said side face comprising ribs r and grooves g between adjacent ribs r. The ribs r and grooves g are preferably suitable for lateral guiding of the rope 2' along a circumference of a rope wheel comprising a counterpart shape for said ribs r and grooves g of the rope 2'.

The composite member 1 is preferably substantially larger in its width direction w than in its thickness direction t. This facilitates the inspection, because the temperature changing 200 can be performed via a flank 1a, 1b thereof, which flank 1a,1b faces in thickness direction of the composite member 1 and which is thereby large in area. Likewise, the scanning can be done in thickness direction t of the composite member 1, scanning a flank 1a, 1b thereof, which flank 1a,1b faces in thickness direction of the composite member 1, so the scanned area will be large in size and temperature deviations stand out clearly. To facilitate the temperature changing 200 and/or scanning 300, the width/thickness ratio of said composite member 1 is preferably more than 2.

Generally, at the point of the composite member 1, where internal flaw or failure F is located, surface temperature of the composite member 1 will react to temperature changes differently than surface temperature of locations surrounding said point. This can be seen on thermal imaging. Scale (size) of the flaw or failure can be seen as well.

Figure 5:
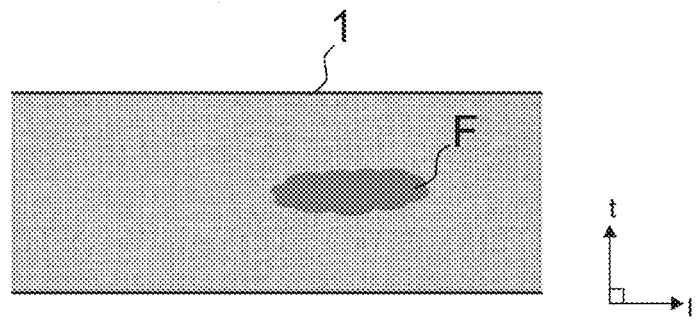
FIG. 5 illustrates a cross section of a section of an elongated composite member as viewed in width direction of the elongated composite member, wherein a humidity spot exists inside the elongated composite member.
Figure 6:
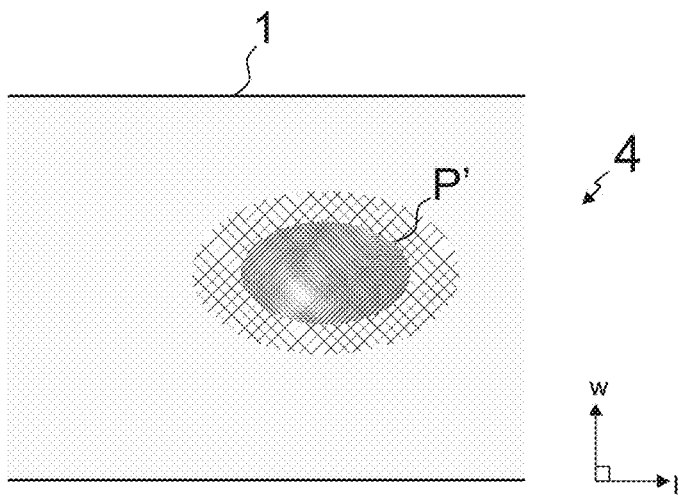
FIG. 6 illustrates a thermographic image taken in thickness direction of the composite member of the section illustrated in FIG. 5.

FIG. 5 shows a cross section of a length of said elongated composite member 1 as viewed in width direction of the composite member 1. A humidity spot F' exists within the section of the composite member 1 illustrated. FIG. 6 shows a thermographic image 4 taken in thickness direction of the composite member 1 of the section illustrated in FIG. 5. The thermographic image 4 reveals that the surface temperature is different at the point of the composite member 1 where the humidity spot F is located, compared to surface temperature of locations surrounding said point. In FIG. 6 this is visible as a temperature deviation P. Assuming the temperature change in this case has been caused by heating the composite member, the surface temperature is lower at the point of the composite member 1 where the humidity spot F is located, compared to surface temperature of locations surrounding said point. This is because penetrated water causes surface temperature decrease due water and humidity soaks all heat. Therefore this location will be cooler compared to surrounding temperature. Accordingly, the temperature deviation P is in this case a temperature dip.

Figure 7:
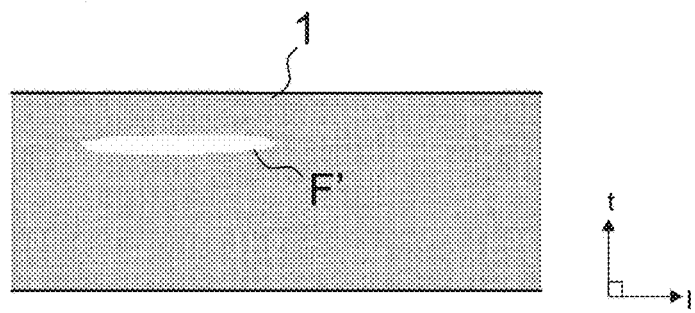
FIG. 7 illustrates a cross section of a section of an elongated composite member as viewed in width direction of the elongated composite member, wherein a delamination spot exists inside the elongated composite member.
Figure 8:
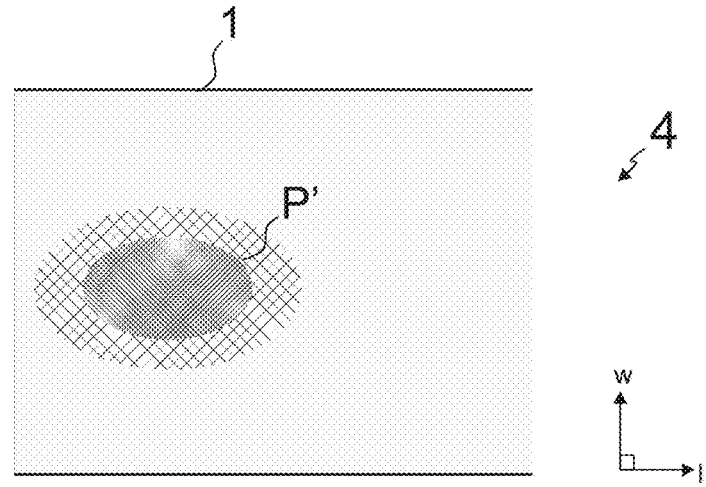
FIG. 8 illustrates a thermographic image taken in thickness direction of the composite member of the section illustrated in FIG. 7.

FIG. 7 shows a cross section of a length of said elongated composite member 1 as viewed in width direction of the composite member 1. A delamination spot F' exists within the section of the composite member 1 illustrated. FIG. 8 shows a thermographic image 4 taken in thickness direction of the composite member 1 of the section illustrated in FIG. 5. The thermographic image 4 reveals that the surface temperature is different at the point of the composite member 1 where the delamination spot F' is located, compared to surface temperature of locations surrounding said point. This is because a discontinuation in the material, such as an airgap, will not conduct heat in same manner than solid construction. In FIG. 8 this is visible as a temperature deviation P'. Assuming the temperature change in this case has been caused by heating the composite member from behind of the composite member and the thermal imaging device takes the thermal image from the front side, the surface temperature is lower at the point of the composite member 1 where the delamination spot F is located, compared to surface temperature of locations surrounding said point. Accordingly, the temperature deviation P' is in this case a temperature dip.

Preferably, said detecting temperature deviations P,P' comprises detecting temperature peaks and/or temperature dips, in the thermographic images of said elongated composite member 1. Then, preferably said detecting temperature peaks comprises detecting in the thermographic images areas where temperature exceeds a predetermined limit. Then, preferably said detecting temperature dips comprises detecting in the thermographic images areas where temperature is below a predetermined limit. In addition, or as an alternative to detecting said dips and/or peaks, preferably said detecting temperature peaks and/or temperature dips in the thermographic images comprises comparing zones of a thermographic image or thermographic images with each other. In said comparing, zones that are in longitudinal direction of said elongated composite member 1 from consecutive sections of the composite member 1 are compared, and said detecting comprises detecting substantial temperature differences between such zones, such as temperature differences of predetermined magnitude, i.e. temperature differences that exceed a predetermined threshold.

As, a temperature deviation P,P' gives indication that there is likely a structural discontinuity at the point of the temperature deviation P,P', it is advisable to respond to detection of a temperature deviation P,P' appropriately. Thus, it is preferred, the method further comprises performing one or more predefined actions when a temperature deviation P,P', such as a temperature peak or temperature dip is detected in the one or more thermographic images. Said one or more predefined actions may include one or more of producing an alarm signal; storing data indicating location of the elongated composite member 1 wherein a temperature deviation P,P', such as a temperature peak or temperature dip was detected; storing thermographic image(s) of the location of the elongated composite member 1 wherein a temperature deviation P,P', such as a temperature peak or temperature dip was detected and making a marking on the location of the elongated composite member 1 wherein a temperature deviation P,P', such as a temperature peak or temperature dip was detected.

Figure 9:
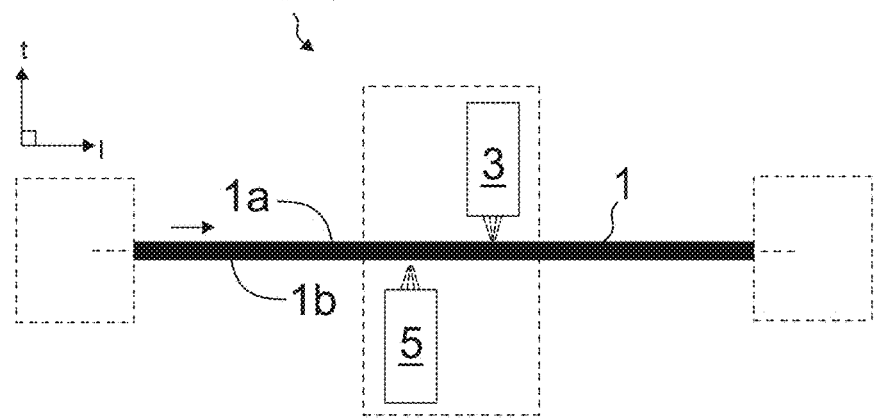
FIG. 9 illustrates a first preferred embodiment of an arrangement implementing the method.

FIG. 9 illustrates a first preferred embodiment of the method. In this embodiment, the method is performed during the manufacturing of a rope, such as a rope 2,2' illustrated in FIG. 4a or 4b. The inspection can be carried out basically in any point of a manufacturing line of the rope 2,2' after formation of the composite member 1. The elongated composite member may or may not have a coating c. The elongated composite member 1 to be inspected is guided to run via a stationary inspection station A,B,C comprising said thermal imaging device 3. Said elongated composite member 1 passes past said thermal imaging device 3, which continuously or intermittently performs scanning of said elongated composite member 1. The whole length of the composite member 1 can be guided to run via a stationary inspection station A,B,C comprising said thermal imaging device 3 so the whole length thereof can be inspected. The method can this way be performed as an on-line inspection method in a factory in a manufacturing line of the rope 2,2' that the composite member 1 is to form part of. In the first embodiment of the method illustrated in FIG. 9, in said changing 200, the temperature of said elongated composite member 1 is changed by cooling said elongated composite member 1 before the scanning 300 with a thermal imaging device 3. FIG. 9 illustrates with broken line boxes the process steps preceding and following the inspection station A,B,C. Preferred details of these process steps are described later referring to FIGS. 10 and 11.

For the purpose of said cooling, the stationary inspection station A,B,C can comprise a cooling device 5 arranged to cool the composite member 1 before it is guided to pass past said thermal imaging device 3, as illustrated in FIG. 9. Preferably, in said cooling said elongated composite member 1 or a rope 2,2' comprising said elongated composite member 1 is cooled with fluid of substantially lower temperature than the temperature of said elongated composite member 1. Preferably, said fluid is sprayed or blown by a spraying or blowing machine against said elongated composite member 1, or a rope 2,2' comprising said elongated composite member 1 (if the composite member 1 is already part of a rope), in particular against the surface of said elongated composite member 1 or a rope 2,2' comprising said elongated composite member 1. Said fluid can be gaseous fluid, such as ambient air, or liquid.

The deviations of temperature of the composite member 1 produced in flaw or failure spots within the composite member are best visible when the changing of temperature is swift so that the temperature differences do not have time to even out. For facilitating swiftness of said temperature changing 200, it is preferable that the cooling is performed by aid of a cooling device 5. However, presence of a cooling device 5 is optional, because it is possible to make the ambient air to provide adequately swift and substantial cooling effect, e.g. by aid of high-speed movement of the composite member 1 itself.

The deviations of temperature caused by flaw or failure spots within the composite member 1 are best visible when the temperature change is considerable. This is simply facilitated if the core temperature of the elongated composite member 1 when starting said changing 200 is high, preferably at least 50 deg or more. For this end, it is preferable that in said providing 100, an elongated composite member 1 is provided which has a high temperature, preferably such that a core temperature of the elongated composite member 1 is at least 50 Celsius degrees or more. Another advantage in cooling from a high temperatures is also that thus it is possible to achieve considerable cooling with simple means while avoiding unnecessary freezing of the composite member 1. Another advantage in cooling from a relatively high temperature is also that the heat accumulated in the composite member 1 can be utilized in the method. Particularly, after pultrusion process forming said elongated composite member 1, after a surface treatment process of the surface of the composite member 1 and after an extrusion process for applying coating on the composite member 1, the composite member 1 is in a heated state, typically such that a core temperature of the elongated composite member 1 is at least 50 Celsius degrees or more. After one of these process stages, it is particularly preferable to carry out said temperature changing 200 and the subsequent scanning 300.

Figure 10:
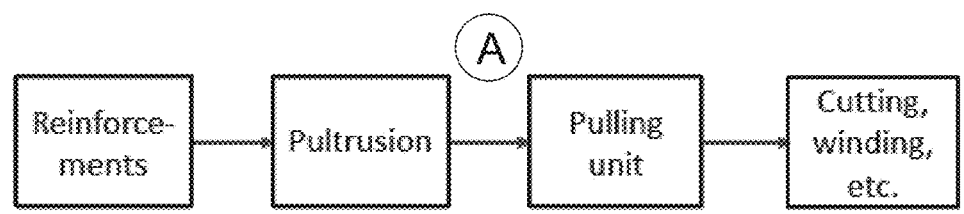
FIG. 10 illustrates a preferred point in the manufacturing line of the composite member where an inspection station can be located.

FIG. 10 illustrates a preferred point in the manufacturing line of the composite member 1, where the inspection station A is located, and thus where the temperature changing 200 by cooling and the subsequent scanning 300 with the thermal imaging device 3 is to be performed. In this embodiment, in said cooling 200, heat accumulated in said elongated composite member 1 during manufacturing process of said elongated composite member 1 is removed from said elongated composite member 1. The aforementioned method step of providing 100 an elongated composite member 1 comprises in this embodiment forming said elongated composite member 1, particularly by pultrusion where reinforcing fibers f are embedded in a matrix material m and driven through a die. Then, in said cooling heat accumulated in said forming (by pultrusion) is removed from said elongated composite member 1. The changing 200 of the temperature by cooling and the subsequent scanning 300 are then performed right after the forming, i.e. in this case pultrusion, but at least before winding of the composite member 1 on a reel because these steps are performed in the manufacturing line of the composite member 1. In the embodiment of FIG. 10, the elongated composite member does not have a coating c yet at the time when the steps 200 and 300 are performed.

Figure 11:
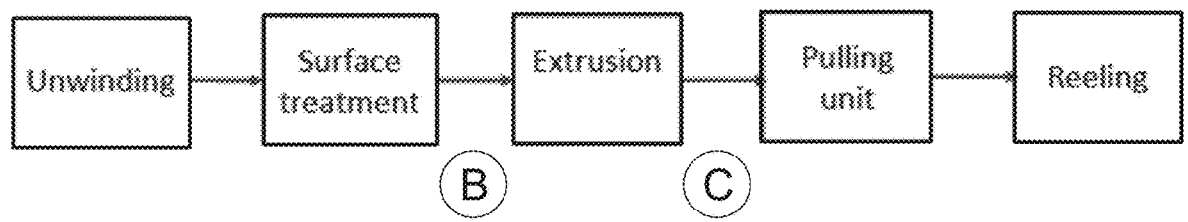
FIG. 11 illustrates preferred alternative points in the manufacturing line of the rope where an inspection station can be located.

FIG. 11 illustrates a preferred point in the manufacturing line of the rope 2,2', in which point the inspection station B,C is located, and thus where the temperature changing 200 by cooling and the subsequent scanning 300 with the thermal imaging device 3 is to be performed. In this case the composite member 1 has already been formed earlier. In this embodiment, there are two alternative points in the manufacturing line of the rope 2,2'. In this embodiment, in said cooling 200, heat accumulated in said elongated composite member 1 during manufacturing process of said elongated composite member 1 is removed from said elongated composite member 1. This can be simply done by locating an inspection station B after a surface treatment station, or by locating an inspection station C after an extrusion station.

In the option where the inspection station B is located after a surface treatment station, the manufacturing process of the rope 2,2' comprises surface treatment of said elongated composite member 1, such as plasma treatment, wherein temperature of said elongated composite member 1 rises. At least part of the aforementioned accumulated heat to be removed has been accumulated in said elongated composite member 1 in said surface treatment. In other words, in said cooling heat accumulated in said surface treatment is removed from said elongated composite member 1. The changing of temperature 200 by cooling and the subsequent scanning 300 are then performed after the surface treatment and before the following process for applying of a coating c on the composite member 1, i.e. in this case extrusion. With the inspection stations B, the elongated composite member does not have a coating c yet at the time when the steps 200 and 300 are performed.

In the option where the inspection station C is located after an extrusion station, the manufacturing process of the rope 2,2' comprises applying of heated coating c, eg. having temperature over 100 deg Celsius, on said elongated composite member 1, such as by extrusion coating, in which applying temperature of said elongated composite member 1 rises. At least part of the aforementioned accumulated heat to be removed has been accumulated in said elongated composite member 1 in said applying, said applying preferably being in the form of extrusion coating. In other words, in said cooling heat accumulated in said applying of heated coating c is removed from said elongated composite member 1. The changing of temperature 200 by cooling and the subsequent scanning 300 are then performed after the applying of heated coating on said elongated composite member 1, and before the following step of winding the rope 2,2' on a reel, because these steps are performed in the manufacturing line of the rope 2,2'. With the inspection station C, the elongated composite member already has a coating cat the time when the step 300 is performed.

As for the direction of the cooling, it is preferable that said cooling comprises directing cooling from one side of said elongated composite member 1 on a flank 1b of the composite member 1 that faces away from the thermal imaging device 3, as illustrated in FIG. 9 for instance. Thus, the cooling and scanning 300 are performed from opposite lateral sides of the composite member 1. Said changing 200 the temperature of said elongated composite member 1 and said scanning 300 are directed on opposite flanks 1a,1b of said elongated composite member 1. Thereby, in the scanning 300 the effect of the cooling from the opposite side will be seen. Any flaws or failures, such as delaminations, large voids, holes etc., that affect through-thickness thermal conductivity of the composite member 1 will be seen as deviations of temperature of the composite member 1. Defects in the coating on the detector side can also detected.

Figure 12:
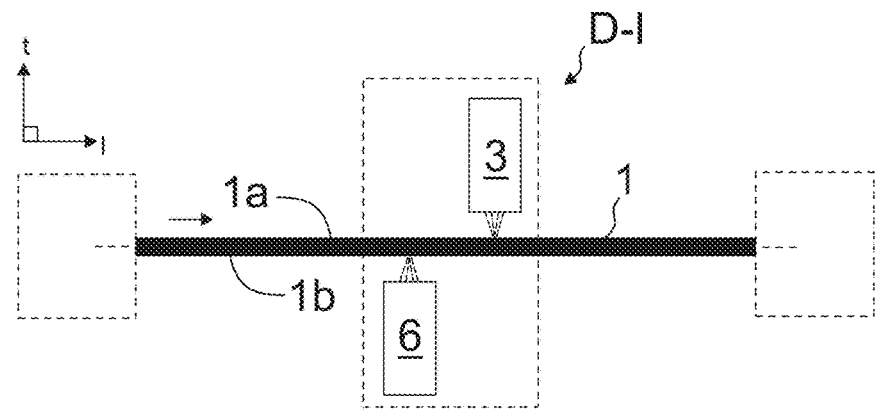
FIG. 12 illustrates a second preferred embodiment of an arrangement implementing the method.

FIG. 12 illustrates a second preferred embodiment of the method. In this embodiment, the method is performed during the manufacturing of a rope, such as a rope 2,2' illustrated in FIG. 4a or 4b. The inspection can be carried out basically in any point of a manufacturing line of the rope 2,2' after formation of the elongated composite member 1. The elongated composite member may or may not have a coating c. The elongated composite member 1 to be inspected is guided to run via a stationary inspection station D, E, F, G, H, I comprising said thermal imaging device 3. Said elongated composite member 1 passes past said thermal imaging device 3, which continuously or intermittently performs scanning of said elongated composite member 1. The whole length of the composite member 1 can be guided to run via a stationary inspection station D, E, F, G, H, I comprising said thermal imaging device 3 so the whole length thereof can be inspected. The method can this way be performed as an on-line inspection method in a factory in a manufacturing line of the rope 2,2' that the composite member 1 is to form part of. In the second embodiment of the method illustrated in FIG. 12, in said changing 200, the temperature of said elongated composite member 1 is changed by heating said elongated composite member 1 before the scanning 300 with a thermal imaging device 3. FIG. 9 illustrates with broken line boxes the process steps preceding and following the inspection station D, E, F, G, H, I. Preferred details of these process steps are described later referring to FIGS. 13 and 14.

For the purpose of said heating, the stationary inspection station D, E, F, G, H, I can comprise a heating device 6 arranged to heat the composite member 1 before it is guided to pass past said thermal imaging device 3, as illustrated in FIG. 12.

In one preferred option, said heating comprises electromagnetic induction heating, in which case the heating device 6 of FIG. 12 is an electromagnetic induction heater.

As for the direction of the heating, it is preferable that said heating comprises directing heating from one side of said elongated composite member 1 on a flank 1b of the composite member 1 that faces away from the thermal imaging device 3, as illustrated in FIG. 12 for instance. Thus, the heating and scanning 300 are performed from opposite lateral sides of the composite member 1. Said changing 200 the temperature of said elongated composite member 1 and said scanning 300 are directed on opposite flanks 1a,1b of said elongated composite member 1. Thereby, in the scanning 300 the effect of the heating from the opposite side will be seen. Any flaws or failures, such as delaminations, large voids, holes etc., that affect through-thickness thermal conductivity of the composite member 1 will be seen as deviations of temperature of the composite member 1. Defects in the coating on the detector side can also detected.

Said induction heating most preferably comprises heating by pulsed phase thermography (PPT), such as pulsed phase thermography using a planar coil optimized for the anisotropic conductivity of the composite member. Induction frequency is preferably 5-20 MHz whereby the coating, if any, can be penetrated and the induced currents can be concentrated on the flank surface (skin effect). This gives pulses of heat that traverse across the thickness of the specimen and are imaged on the other side.

Figure 13:
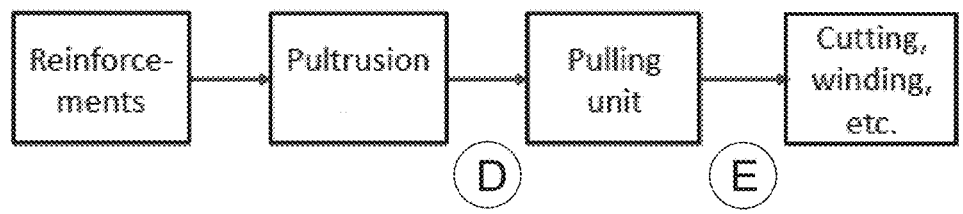
FIG. 13 illustrates preferred alternative points in the manufacturing line of the composite member where an inspection station can be located.

FIG. 13 illustrates two preferred alternative points in the manufacturing line of the composite member 1, where the inspection station D,E is to be located, and thus where the temperature changing 200 by heating and the subsequent scanning 300 with the thermal imaging device 3 is to be performed. When the inspection station D,E is located in the process as illustrated in FIG. 13, said temperature changing 200 by heating is preferably performed by aid of a heating device 6. The aforementioned method step of providing 100 an elongated composite member 1 comprises in this embodiment forming said elongated composite member 1, particularly by pultrusion where reinforcing fibers f are embedded in a matrix material m and driven through a die. The aforementioned method steps of changing 200 by heating and the subsequent scanning 300 are in this embodiment performed after the forming, i.e. in this case pultrusion. These steps are performed in the manufacturing line of the composite member 1, so they are performed before winding of the composite member 1 on a reel. In the embodiment of FIG. 13, the elongated composite member does not have a coating c yet at the time when the steps 200 and 300 are performed.

Figure 14:
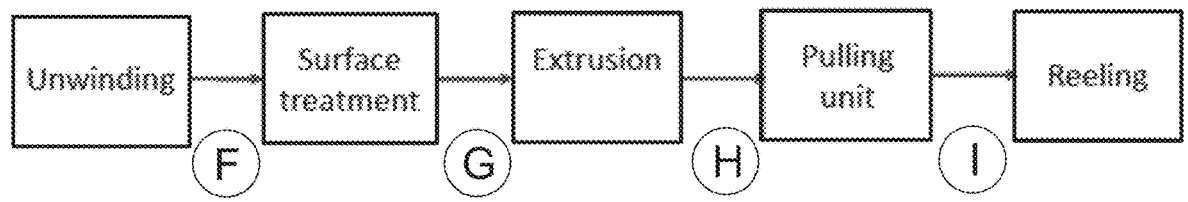
FIG. 14 illustrates preferred alternative points in the manufacturing line of the rope where an inspection station can be located.

FIG. 14 illustrates four preferred alternative points in the manufacturing line of the rope 2,2', where the inspection station F,G,H,I is to be located, and thus where the scanning 300 with the thermal imaging device 3 is to be performed. In this case the composite member 1 has already been formed earlier. With the inspection stations F and G, the elongated composite member does not have a coating c yet at the time when the steps 200 and 300 are performed. With the inspection stations H and I, the elongated composite member 1 already has a coating c at the time when the step 300 is performed.

When the inspection station D,E,F,G,H,I is located in the process as illustrated in FIGS. 13 and 14, said temperature changing 200 by heating is preferably performed by aid of a heating device 6. However, presence of a separate heating device can be omitted if a process stage preceding the inspection station itself comprises a heating device which can heat the composite member 1 such that the temperature change can be used for detection of temperature deviations P,P' in thermographic images of the composite member 1. Accordingly, said changing 200 the temperature of said elongated composite member 1 by heating can comprise a step of manufacturing process of the rope 2,2', wherein temperature of said elongated composite member 1 rises.

In the process of FIG. 13 said step of manufacturing process of the rope 2,2', wherein temperature of said elongated composite member 1 rises, can be pultrusion. This can be implemented by locating the inspection station in point D in FIG. 13. In the process of FIG. 14 said step of manufacturing process of the rope 2,2', wherein temperature of said elongated composite member 1 rises, can be a surface treatment of said elongated composite member 1, such as plasma treatment or alternatively applying of hot coating on said elongated composite member 1, such as by extrusion coating. These alternatives can be implemented by locating the inspection station in point G or H, respectively as illustrated in FIG. 14.

Generally, said changing 200 the temperature of said elongated composite member 1 by heating or cooling said elongated composite member 1 particularly via a flank 1a,1b thereof is advantageous as it enables that said changing 200 of the temperature needs to be directed on only a length of said elongated composite member 1 at a time, which length is substantially shorter than the overall length of the elongated composite member 1, preferably less than 10% of the overall length of the elongated composite member 1. At simplest, the inspection can be performed for a very short length of the composite member 1, whereby only small part of the manufacturing process of the rope will be affected by the inspection. Generally, the inspection method described is advantageous because it can be performed in a small space and without considerably disturbing the surroundings of the section under inspection, such as other parts of the manufacturing process. Moreover, the method is advantageously simple to implement, and it can be performed energy efficiently. Using the flank 1a,1b also provides that the temperature changing 200 can be performed utilizing heat generated in the manufacturing process, but also that cooling can be used, instead of heating for producing a temperature change.

The composite member 1 is preferably more specifically as described hereinafter. The fibers f are preferably substantially untwisted in relation to each other, which provides them said orientation parallel with the composite member 1, and finally so with the longitudinal direction of the rope 2,2' as well. The reinforcing fibers f are preferably long continuous fibers in the longitudinal direction of the elongated composite member 1, preferably continuing unbroken throughout the whole length of the elongated composite member 1. As mentioned, the reinforcing fibers f are preferably distributed in the matrix m substantially evenly. The fibers f are then arranged so that the composite member 1 would be as homogeneous as possible in the transverse direction thereof. Owing to the even distribution, the fiber density in the cross-section of the elongated composite member 1 is substantially constant. The composite matrix m, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but any other suitable alternative materials can be used. The matrix m has been applied on the fibers f such that a chemical bond exists between each individual reinforcing fiber f and the matrix m. Thereby a uniform structure is achieved. To improve the chemical adhesion of the reinforcing fiber to the matrix m, in particular to strengthen the chemical bond between the reinforcing fiber f and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix are optimized. The polymer matrix m is preferably of a hard non-elastomer, such as said epoxy, as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance.

As above mentioned, the matrix m of the elongated composite member 1 is most preferably hard in its material properties. A hard matrix m helps to support the reinforcing fibers f, especially when the rope bends, preventing buckling of the reinforcing fibers f of the bent rope, because the hard material supports the fibers f efficiently. To reduce the buckling and to facilitate a small bending radius of the elongated composite member 1, among other things, it is therefore preferred that the polymer matrix m is hard, and in particular non-elastomeric. The most preferred materials for the matrix are epoxy resin, polyester, phenolic plastic or vinyl ester. The polymer matrix m is preferably such that its modulus of elasticity E is over 2 GPa, most preferably over 2.5 GPa. In this case the modulus of elasticity E is preferably in the range 2.5-10 GPa, most preferably in the range 2.5-4.5 GPa. There are commercially available various material alternatives for the matrix m which can provide these material properties. Preferably over 50% proportion of the area of the cross-section of the elongated composite member 1 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining area is of polymer matrix m. Most preferably, this is carried out such that approx. 60% of the area is of reinforcing fiber and approx. 40% is of matrix material (preferably epoxy material). In this way a good longitudinal stiffness for the elongated composite member 1 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The elongated composite member 1 is preferably completely non-metallic, i.e. made not to comprise metal.

In the method for manufacturing a hoisting rope 2,2' of a hoisting apparatus, such as an elevator, a rope 2,2' is manufactured, which comprises one or more composite members 1 as load bearing members of the rope 2,2', said elongated composite member 1 comprising non-metallic reinforcing fibers f embedded in polymer matrix m, said reinforcing fibers preferably being carbon fibers or glass fibers. An embodiment of the rope 2,2' is illustrated in FIG. 4. The rope 2,2' manufactured is such that each composite member 1 continues unbroken throughout the length of the rope 2,2'. The rope 2,2' manufactured is such that each composite member 1 is parallel with the longitudinal direction of the rope 2,2'. In the method an elongated composite member 1 is formed. The method for manufacturing the hoisting rope 2,2' comprises inspecting quality and/or condition of one or more of the elongated composite members 1 with a method as described above. Accordingly, inspecting quality and/or condition of one or more of the elongated composite members 1 is performed during the manufacturing of the rope 2,2'. Preferred details of the manufacturing process have been illustrated in FIGS. 10-11 and 13-14.

In the preferred embodiments, an advantageous shape of the composite member 1 and an advantageous shape and internal layout of the rope 2,2' have been disclosed. However, the invention can also be utilized with differently shaped composite members and with ropes which comprise differently shaped composite members or a different number of them.

The method, and the various embodiments thereof presented, can be used to obtain one or more advantages mentioned in the application. The methods can for instance be used to reveal the location and the kind of damage of a composite member very accurately. The methods can be used for catching manufacturing errors, to monitor quality within or at the end of the rope production line. The methods can be used to evaluate possible rope component damage before elevator installation (if, for example, rope has been damaged during transport and damage is seen visually). The methods can be also used to evaluate rope condition during regular maintenance of an elevator. It is not necessary that the method is performed as part of a manufacturing process of the rope. In its broadest sense, the method can be also used to inspect composite member(s) of a rope already forming part of an elevator.

As it was described above, said changing 200 the temperature of said elongated composite member 1 and said scanning 300 can be directed on opposite flanks 1a,1b of said elongated composite member 1. Any flaws or failures affect through-thickness thermal conductivity of the composite member 1 will be seen as deviations of temperature of the composite member 1. This kind of implementation is however not necessary, because alternatively said changing the temperature of said elongated composite member 1 and said scanning can be directed on the same flank of said elongated composite member, in which case reflections of temperature changes, such as reflections of heat waves, can be detected in the thermographic images created based on output of said scanning.

In the above, preferred ways of producing heating effect have been described. Alternatively, the aforementioned heating could be performed by bending the composite member rapidly one or more times, or by producing vibration in the composite member particularly to cause more heating around highly stressed areas (defective areas). Also alternatively, mechanical loading can be used for adiabatically heating the composite member.

In the preferred embodiment described above, where said temperature changing is performed by cooling, the core temperature of the elongated composite member 1, when starting said temperature changing by cooling, is relatively high. This is however not necessary, particularly when low temperature is acceptable. Cooling as far as to zero Celsius degrees or below, is advantageous if more clear deviations are wanted. The contrast generated by differences in volumetric heat capacity would be much higher if a phase transition is introduced. If there is a water inclusion inside the composite member 1, and the water undergoes a phase transition, a significant improvement in thermal contrast is achieved. The phase transition could likewise be used in the embodiment where said temperature changing is performed by heating. Then, the core temperature of the elongated composite member 1, when starting said heat changing by heating, is zero Celsius degrees or below so that water inside the composite member 1 would undergo a phase transition in the heating.

In the above, it is disclosed a method for inspecting quality and/or condition of an elongated composite member 1. However, the method steps can additionally or alternatively be used for inspecting quality and/or condition of a coating provided on an elongated member 1, which may, or may not, be a composite member as described above. This may be advantageous particularly when the coating c has a complicated contoured structure, such as grooved structure illustrated in FIG. 4b.

In the application, by definition that the composite member 1 is a precursor of a load bearing member of a hoisting rope 2,2' of a hoisting apparatus it is meant that the composite member 1 is not yet a completed load bearing member of a hoisting rope 2,2' of a hoisting apparatus. Accordingly, the composite member 1 can be a load bearing member of a hoisting rope 2,2' of a hoisting apparatus in the process of being made. For example, its suitability for load bearing may not yet be fully achieved (e.g. the final hardness of the composite might not yet be fully reached).

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for inspecting a quality and/or condition of an elongated composite member, which is a load bearing member of a hoisting rope of a hoisting apparatus or a precursor of the load bearing member, the method comprising:

providing the elongated composite member;

changing a temperature of said elongated composite member by cooling said elongated composite member via a flank thereof, the cooling including inducing heat transfer from the elongated composite member to a fluid that is in relative motion with respect to the elongated composite member such that the elongated composite member is in a cooled state after said changing of the temperature is complete;

scanning said elongated composite member from a lateral side thereof with a thermal imaging device after said changing of the temperature is complete and the elongated composite member is in the cooled state; and creating thermographic images of said elongated composite member based on the scanning, wherein the method is performed during a manufacturing of the hoisting rope including said elongated composite member.

2. The method according to claim 1, wherein the scanning is performed in a thickness direction of the elongated composite member, scanning the flank thereof, which flank faces in the thickness direction of the elongated composite member.

3. The method according to claim 1, wherein the elongated composite member is substantially larger in a width direction than in a thickness direction.

4. The method according to claim 1, wherein said elongated composite member comprises non-metallic reinforcing fibers embedded in polymer matrix, said non-metallic reinforcing fibers including carbon fibers or glass fibers.

5. The method according to claim 1, wherein said changing the temperature of said elongated composite member is directed on separate respective lengths of the elongated composite member at a time, each of the separate respective lengths of the elongated composite member being less than 10% of an overall length of the elongated composite member.

6. The method according to claim 1, wherein said elongated composite member is guided to run via a stationary inspection station comprising said thermal imaging device.

7. The method according to claim 1, wherein the method further comprises detecting temperature deviations including temperature peaks and/or temperature dips in the thermographic images of said elongated composite member.

8. The method according to claim 7, wherein the method further comprises performing one or more predefined actions when a temperature deviation, including a temperature peak or temperature dip, is detected in the thermographic images.

9. The method according to claim 1, wherein in said providing, the elongated composite member is provided having a core temperature at least 50 Celsius degrees or more.

10. The method according to claim 1, wherein said cooling is performed by aid of a cooling device.

11. The method according to claim 1, wherein said changing the temperature of said elongated composite member and said scanning of said elongated composite member are directed on opposite flanks of said elongated composite member.

12. A method for inspecting a quality and/or condition of an elongated composite member, which is a load bearing member of a hoisting rope of a hoisting apparatus or a precursor of the load bearing member, the method comprising:

providing the elongated composite member;

changing a temperature of said elongated composite member by cooling said elongated composite member via a flank thereof, the cooling including inducing heat transfer from the elongated composite member to a fluid that is in relative motion with respect to the elongated composite member such that the elongated composite member is in a cooled state after said changing of the temperature is complete;

scanning said elongated composite member from a lateral side thereof with a thermal imaging device after said changing of the temperature is complete and the elongated composite member is in the cooled state; and creating thermographic images of said elongated composite member based on the scanning, wherein in said cooling, heat accumulated in said elongated composite member during a manufacturing process of said elongated composite member or the hoisting rope including said elongated composite member is removed from said elongated composite member.

13. The method according to claim 12, wherein the manufacturing process of said elongated composite member or the hoisting rope including said elongated composite member comprises forming said elongated composite member by pultrusion, and at least part of said heat accumulated in said elongated composite member is accumulated during said forming.

14. The method according to claim 12, wherein the manufacturing process of the hoisting rope including the elongated composite member comprises surface treatment of said elongated composite member by plasma treatment, wherein the temperature of said elongated composite member rises, and at least part of said heat accumulated in said elongated composite member is accumulated during said surface treatment.

15. The method according to claim 12, wherein the manufacturing process of the hoisting rope including the elongated composite member comprises applying a heated coating on said elongated composite member by extrusion coating, and at least part of said heat accumulated in said elongated composite member is accumulated during said applying the heated coating.

16. The method according to claim 15, wherein the heated coating is made of polymer material.

17. The method according to claim 12, wherein the scanning is performed in a thickness direction of the elongated composite member, scanning the flank thereof, which flank faces in the thickness direction of the elongated composite member.

18. The method according to claim 12, wherein said elongated composite member comprises non-metallic reinforcing fibers embedded in polymer matrix, said non-metallic reinforcing fibers including carbon fibers or glass fibers.

19. The method according to claim 12, wherein said changing the temperature of said elongated composite member is directed on separate respective lengths of the elongated composite member at a time, each of the separate respective lengths of the elongated composite member being less than 10% of an overall length of the elongated composite member.

20. A method for inspecting a quality and/or condition of an elongated composite member, which is a load bearing member of a hoisting rope of a hoisting apparatus or a precursor of the load bearing member, the method comprising:

providing the elongated composite member;

changing a temperature of said elongated composite member by cooling said elongated composite member via a flank thereof, the cooling including inducing heat transfer from the elongated composite member to a fluid that is in relative motion with respect to the elongated composite member such that the elongated composite member is in a cooled state after said changing of the temperature is complete;

scanning said elongated composite member from a lateral side thereof with a thermal imaging device after said changing of the temperature is complete and the elongated composite member is in the cooled state; and creating thermographic images of said elongated composite member based on the scanning, wherein in said providing said elongated composite member, said elongated composite member is provided having heat accumulated from a manufacturing process of the elongated composite member or from a manufacturing process of the hoisting rope including the elongated composite member.

21. The method according to claim 20, wherein the manufacturing process of the hoisting rope including the elongated composite member comprises a plurality of steps, wherein the temperature of said elongated composite member rises, and at least part of the heat accumulated in said elongated composite member is accumulated during at least one step of the plurality of steps of the manufacturing process of the hoisting rope.

22. The method according to claim 21, wherein said at least one step of the plurality of steps of the manufacturing process of the hoisting rope including the elongated composite member is surface treatment of said elongated composite member, forming of said elongated composite member by pultrusion, or application of a hot coating on said elongated composite member.

23. The method according to claim 20, wherein the scanning is performed in a thickness direction of the elongated composite member, scanning the flank thereof, which flank faces in the thickness direction of the elongated composite member.

24. The method according to claim 20, wherein said elongated composite member comprises non-metallic reinforcing fibers embedded in polymer matrix, said non-metallic reinforcing fibers including carbon fibers or glass fibers.

25. The method according to claim 20, wherein said changing the temperature of said elongated composite member is directed on separate respective lengths of the elongated composite member at a time, each of the separate respective lengths of the elongated composite member being less than 10% of an overall length of the elongated composite member.

26. A method for manufacturing a hoisting rope of a hoisting apparatus, the hoisting rope comprising one or more elongated composite members as load bearing members of the hoisting rope, the method comprising:

inspecting a quality and/or condition of the one or more said elongated composite members based on providing the one or more said elongated composite member, changing a temperature of the one or more said elongated composite member by cooling the one or more said elongated composite member by cooling the one or more said elongated composite members via a flank thereof, the cooling including inducing heat transfer from the one or more said elongated composite members such that the one or more said elongated composite members is in a cooled state after said changing of the temperature is complete, scanning the one or more said elongated composite members from a lateral side thereof with a thermal imaging device after said changing of the temperature is complete and the one or more said elongated composite member is in the cooled state, and creating thermographic images of the one or more said elongated composite member based on the scanning.

* * * * *